(12) United States Patent
Bosseler

(10) Patent No.: US 8,004,697 B2
(45) Date of Patent: Aug. 23, 2011

(54) METHOD AND SYSTEM FOR ADAPTIVE CONTROL OF IOT OPERATION CYCLING

(75) Inventor: Thomas A. Bosseler, Palos Verdes Estates, CA (US)

(73) Assignee: Xerox Corporation, Norwalk, CT (US)

( * ) Notice: Subject to any disclaimer, the term of this patent is extended or adjusted under 35 U.S.C. 154(b) by 1727 days.

(21) Appl. No.: 11/239,246

(22) Filed: Sep. 30, 2005

(65) Prior Publication Data

US 2007/0076733 A1    Apr. 5, 2007

(51) Int. Cl.
*G06F 3/12* (2006.01)

(52) U.S. Cl. .................. 358/1.13; 713/320; 713/323

(58) Field of Classification Search ............ None
See application file for complete search history.

(56) References Cited

U.S. PATENT DOCUMENTS

| 6,359,642 | B1* | 3/2002 | Smith et al. ............ | 347/247 |
| 6,442,661 | B1* | 8/2002 | Dreszer ............ | 711/170 |
| 6,563,519 | B1* | 5/2003 | Minagawa ............ | 715/764 |
| 7,154,626 | B2* | 12/2006 | Silverbrook et al. ........ | 358/1.15 |

FOREIGN PATENT DOCUMENTS

JP    06209330 A   *  7/1994

\* cited by examiner

*Primary Examiner* — Twyler Haskins
*Assistant Examiner* — Lennin Rodriguez
(74) *Attorney, Agent, or Firm* — MH2 Technology Law Group LLP

(57) ABSTRACT

Embodiments of the present invention provide adaptive control of an imaging device based on current document complexity and printer processing capability. During operation, the future length of the job queue is predicted dynamically. The predicted queue length is periodically compared to a predetermined threshold value. The first mode of the device is changed to a second mode based on the predicted queue length being greater than the predetermined queue length.

13 Claims, 4 Drawing Sheets

METHOD AND SYSTEM FOR ADAPTIVE CONTROL OF IOT OPERATION CYCLING

DESCRIPTION OF THE INVENTION

1. Field of the Invention

This invention relates generally to an image output terminal. More particularly, the invention relates to adaptive control of the operation cycling of the image output terminal.

2. Background of the Invention

Printing systems are generally well known and have useful applications from industrial to personal. A typical printing system includes an image source, a digital front end and an image output terminal ("IOT"). The image source may generate or supply digital image data to the digital front end. The digital front end may be configured to convert the digital image data to print data for the image output terminal. The IOT may then render the digital image on the appropriate media, e.g., paper.

The IOT may be configured with three operational states: power saver (or off) mode, an idle mode, and a marking mode. In the power saver mode, power consumption has been reduced to a bare minimum. In the idle mode, the IOT has full power but the IOT is not operating. In the marking mode, the IOT may be full powered and is processing a digital image for transfer on the appropriate medium.

The IOT may transition between the three operational states depending on the number of print jobs being sent to the printing system. The transition is not instantaneous and typically requires a long delay to move from one state to another. For example, the JOT is generally configured to be in a power saver mode if a print job has not been received in a long period of time. The IOT may take a several minutes to transition from the power saver mode to the idle mode, i.e., ready to print mode, in response to receiving a print job.

After being in the idle mode, the IOT may be signaled to transition to the marking mode. This transition may be on the order of a minute. The IOT may remain in the marking mode as long as the digital front end supplies data rasters (i.e., bitmaps, bytemaps, etc.) to mark.

The IOT marks individual pages at a periodic rate (known as the "pitch time") or continuously marks a moving roll of paper (known as a "web-fed" IOT). In the event that the digital front end does not supply a data raster at appropriate time, the IOT may then be forced to "skip a pitch" (or "clutch" on web-fed IOTs). The occasional missed pitch is usually not a problem. However, if enough consecutive pitches are skipped, the IOT may transition from marking mode to idle mode, which takes approximately one minute. When the digital front end buffers enough pages, the IOT may then re-transition back to the marking mode, and thus, re-incurring the delay transitioning from idle mode to marking mode.

Although skipping a pitch may not be a problem for the user of the printing system, skipping a pitch causes disadvantages and drawbacks. For instance, skipping pitches causes wear and tear on the IOT hardware, e.g., the print engine. Another example is that clutching on web-fed IOTs may ruin the output and cause the job to be discarded. Yet another disadvantage is that the transitioning between marking and idle modes has an enormous negative effect on system productivity due to the transition delays between the modes.

One solution to skipping a pitch or clutching is to buffer a pre-determined number of pages at the digital front end. The selected constant is determined by anecdotal and/or empirical observation of the complexity and length of print jobs at a particular customer site. Typically, the same number of pages are buffered whether the digital front end is receiving simple or complex jobs. A drawback to this solution is that productivity of the simple page jobs suffers because simple page jobs require a smaller number of buffered pages than complex in order to avoid skipping.

Another solution to correct skipping or clutching is to process all the received jobs as one job, i.e., N to 1, before moving the IOT from idle mode to marking mode. In other words, the digital front end may rasterize the entire job, which is typical of web-fed IOTs to avoid clutching.

Yet another solution to the skipping or clutching is to allow the IOT to skip pitches. The wear and tear on the IOT is accepted as part of the operation. The reduced productivity due to IOT mode cycling is also accepted as part of the operation.

SUMMARY OF THE INVENTION

One embodiment pertains to a method of dynamically monitoring the complexity of the job stream. The method includes determining a first mode of a device and determining a predicted queue length of a queue for the device. The method also includes comparing the predicted queue length with a predetermined queue length necessary to keep the device operational. The method further includes changing the first mode of the device to a second mode based on predicted queue length being greater than the predetermined queue length.

Another embodiment generally relates to a system for monitoring. The system includes a digital front end and an image output terminal configured to be interfaced with the digital front end. The digital front end includes an output queue configured to queue print jobs to the image output terminal and a queue monitoring module. The queue monitoring module is configured to monitor the output queue and interface with the image output terminal. The queue monitoring module is also configured to determine a first mode of the image output terminal, determine a predicted queue length of the output queue, compare the predicted queue length with a predetermined queue length necessary to keep the device operational, and change the first mode of the image output terminal to second mode based on predicted queue length being greater than the predetermined queue length.

Yet another embodiment generally pertains to a computer readable storage medium on which is embedded one or more computer programs. The one or more computer programs implement a method of monitoring. The one or more computer programs include a set of instructions for determining a first mode of a device and determining a predicted queue length of a queue for the device. The one or more computer programs also include a set of instructions for comparing the predicted queue length with a predetermined queue length necessary to keep the device operational. The one or more computer programs further include a set of instructions for changing the first mode of the device to second mode based on predicted queue length being greater than the predetermined queue length.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
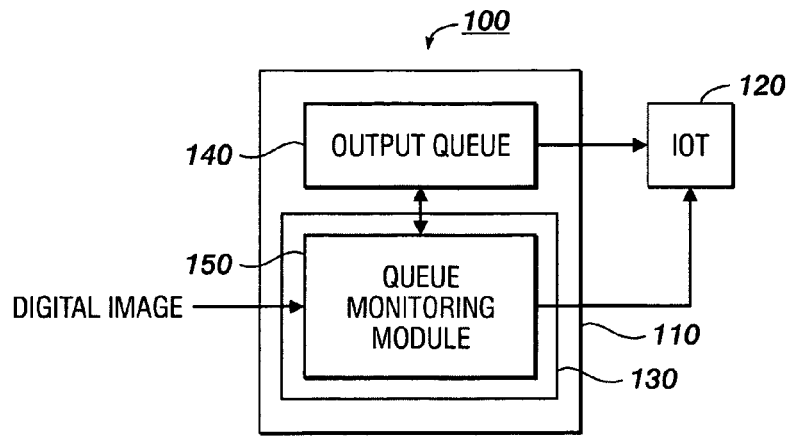
FIG. 1 illustrates a system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of image output terminals, and that any such variations do not depart from the true spirit and scope of the present invention. Moreover, in the following detailed description; references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the invention generally pertain to a system and method of monitoring the modes in an input-output terminal (IOT) from a digital front end (DFE). More particularly, a digital front end may include an output queue and a queue-monitoring module. The output queue may be configured to receive image bitmaps from the DFE and to forward the stored image bitmaps to the IOT when the IOT is in marking mode. The queue-monitoring module may be configured to predict the length of the output queue ($L_p$) at a future time. The queue-monitoring module may transition the IOT to different modes depending on the length of the output queue.

The queue-monitoring module may be configured to determine whether the IOT is in a power-saver mode. If the IOT is in the power-saver mode, the queue-monitoring module may be configured to determine the length of the output queue at a future time, which may be calculated as the present time with the time of power-up, i.e., $t_{now}+t_{powerup}$. If the queue-monitoring module determines that the $L_p$ is greater than a predetermined queue length ($L_{min}$), the queue-monitoring module may signal the JOT to move from the power saver mode to the marking mode. Otherwise, if the $L_p$ is less than $L_{min}$, the queue-monitoring module may return to an idle state until the next calculation of $L_p$.

If the IOT is in the idle mode, the queue-monitoring module may be configured to determine the length of the output queue at the present time with the time to transition from idle to marking mode for the IOT, i.e., $t_{now}+t_{cycleup}$. The queue-monitoring module may then be configured to compare the $L_p$ with a $L_{min}$. If the queue-monitoring module determines that the predicted output queue length is greater than the predetermined queue length, the queue-monitoring module may be configured to move the JOT from the idle mode to the marking mode. Otherwise, the queue-monitoring module may be configured to return to an idle state until the next calculation of $L_p$.

If the IOT is in marking mode, the queue-monitoring module may be configured to predict the length of the output queue at the present time with the time to transition from the marking to idle mode for the IOT, i.e., $t_{now}+t_{cycledown}$. The queue-monitoring module may then be configured to compare $L_p$ with $L_{min}$. If the queue-monitoring module determines that the predicted output queue length is less than the predetermined queue length, the queue-monitoring module may move the IOT from the marking mode to an idle mode. Otherwise, the queue-monitoring module may be configured to return to an idle mode until the next calculation of $L_p$.

FIG. 1 illustrates an exemplary system 100 in accordance with an embodiment of the invention. It should be readily apparent to those of ordinary skill in the art that the system 100 depicted in FIG. 1 represents a generalized schematic illustration and that other components may be added or existing components may be removed or modified.

As shown in FIG. 1, the system 100 includes a digital front end (DFE, 110) and an image output terminal (120, labeled as IOT in FIG. 1). The DFE 110 may be configured to receive digital image data from an image source (not shown). The image source may be a scanner, a personal computer, a network or combination thereof. The image data may include any combination of bitmapped data, grayscale or continuous tone (contone) data, graphics primitives, page description languages (PDLs), etc. In general, the DFE 110 is configured to transform the digital image data into print ready data for the IOT 120. The IOT 120, subsequently, may render the print ready data onto suitable media.

The DFE 110 may be configured to include a raster image processor 130. The raster image processor 130 may be the computing platform that converts the digital image data into print ready data. The raster image processor 130 may be implemented using a microprocessor, a digital signal processor, an application specific integrated circuit, a field programmable gate array or a combination thereof. In some embodiments, the raster image processor 130 may include persistent memory to store software to implement the functionality of the DFE 110.

The DFE 110 may also be configured with an output queue 140. The output queue 140 may be configured to receive the converted digital image, e.g., image bitmaps, bytemaps, etc., from the raster image processor 130. The output queue 140 may be large enough to receive the image bitmaps as fast as the raster image processor 130 can process. The output queue 140 may also be configured to output the converted digital image data to the IOT 120.

As shown in FIG. 1, the raster image processor 130 includes a queue-monitoring module 150. Although the queue-monitoring module 150 is shown as a module of the raster image processor 130, the queue-monitoring module 150 may be separate component from the raster image processor 130 in some embodiments. In other embodiments, the queue-monitoring module 150 may be a software module of the raster image processor 130. In yet other embodiments, the queue-monitoring module 150 may be implemented as a hardware component, e.g., an ASIC, FPGA, etc., in the DFE 110.

The queue-monitoring module 150 may be configured to periodically calculate the length of the output queue 140 ($L_p$) at a future time and to determine an operational mode (power save mode, idle mode or marking mode) for the IOT based, in part, on $L_p$.

The queue-monitoring module 150 may use a variety of techniques to calculate $L_p$. For example, Markovian chain analysis, Monte Carlo simulations, or Bayesian probabilities may be used to determine the $L_p$, the length of the output queue 140. In some embodiments, the queue-monitoring module 150 may implement Equation (1) to determine $L_p$:

$$L_p = L_{outq} + \lambda_t^* \Delta_t - \mu_{out}^* \Delta_t \qquad (1)$$

where $L_{outq}$ may be characterized as the number of images, m, times the number of sets, n, for every job in the output queue 140 at the present time, $t_{now}$. $\Delta_t$ may be characterized as being equal to either $t_{powerup}$, $t_{cycledown}$, or $t_{cycleup}$ depending on the present mode of the IOT 120, which is explained above and in greater detail below. $\lambda_{in}$ may be characterized as being number of images that have actually entered the output queue 140 since the present time minus the time between updates, i.e., $t_{now} - t_{update}$. $\mu_{out}$ may be characterized as being rate of image consumption by the IOT 120.

Returning to FIG. 1, the queue-monitoring module 150 may be configured to determine the current mode of the IOT 120. If the queue-monitoring module 150 determines that the IOT 120 is in the power-save mode, the queue-monitoring module 150 may determine the $L_p$ using Equation 1 where $\Delta_t$ being equaled to the time to transition from powerup from power save mode to marking mode, i.e., $t_{powerup}$. Subsequently, the queue-monitoring module 150 may compare $L_p$ with a predetermined queue length ($L_{min}$). $L_{min}$ may be user-selected or predetermined value. If the queue-monitoring module 150 determines $L_p > L_{min}$, the queue-monitoring module may signal the IOT 120 to move from the power save mode to the marking mode. Otherwise, the queue-monitoring module 150 may move into a wait state, $t_{update}$, and then calculate $L_p$.

If the queue-monitoring module 150 determines that the IOT 120 is in the idle mode, the queue-monitoring module may be configured to determine Lp using equation 1 where $\Delta t$ being equal to the time for the IOT 120 to transition from idle to marking mode, $t_{cycleup}$. Subsequently, the queue-monitoring module 150 may compare $L_p$, with $L_{min}$. If the queue-monitoring module 150 determines $L_p > L_{min}$, the queue-monitoring module may signal the IOT 120 to move from the idle mode to the marking mode. Otherwise, the queue-monitoring module 150 may move into a wait state, $t_{update}$, and then calculate $L_p$.

If the queue-monitoring module 150 determines that the IOT 120 is in marking mode, the queue-monitoring module may be configured to determine Lp using Equation 1 where $\Delta t$ being equal to the time for the IOT 120 to transition from marking to idle mode, $t_{cycledown}$. The queue-monitoring module may then be configured to compare $L_p$ with $L_{min}$. If the queue-monitoring module 150 determines $L_p < L_{min}$, the queue-monitoring module may signal the IOT 120 to move from the marking mode to the idle mode. Otherwise, the queue-monitoring module 150 may move into a wait state, $t_{update}$, and then calculate $L_p$.

In some embodiments, $L_{min}$ may be set to zero. In other embodiments, $L_{min}$ may be set to a higher value to reduce the likelihood of skipped pitches and, thus, reduce wear and tear. However, a higher value of $L_{min}$, also affects the first copy out time, i.e., may increase the wait time to receive a print job.

For most embodiments, $\lambda_{in}$ is typically calculated by counting the number of images arriving during the past $t_{update}$ seconds and multiplying by the number of sets in the current job. Similarly, $t_{update}$ is set to be smaller than the minimum of $t_{cycleup}$ and $t_{cycledown}$. In one embodiment, $t_{update}$ may be set to ten percent of the minimum.

For certain embodiments, $t_{cycleup}$ is usually determined within a minimum/maximum distribution. However, setting $t_{cycleup}$ with a minimum value raises the likelihood of a skipped pitch while improving productivity. Conversely, setting $t_{cycleup}$ with a maximum value reduces the likelihood of skipped pitches while reducing productivity. In one embodiment, $t_{cycleup}$ may be a user set value. In another embodiment, $t_{cycleup}$ may be a modal value.

Similarly, $t_{cycledown}$ may be selected within a minimum/maximum distribution. However, setting $t_{cycledown}$ with a minimum value raises the likelihood of the IOT 120 shutting down the marking mode early and lowering productivity. Conversely, setting $t_{cycledown}$ with a maximum value lowers the probability of transitioning from the marking mode too early but raises the likelihood of skipped pitches. In yet another embodiment, $t_{cycledown}$ may be a user set value. In some embodiments, $t_{cycledown}$ may be set with a default time.

In most embodiments, $\mu_{out}$ may be held constant for most types of IOTs. However, in web-fed IOTs, $\mu_{out}$ may be variable. In some embodiments, $\mu_{out}$ may be set at the high value while in other embodiments $\mu_{out}$ may be a user-defined parameter.

Figure 2:
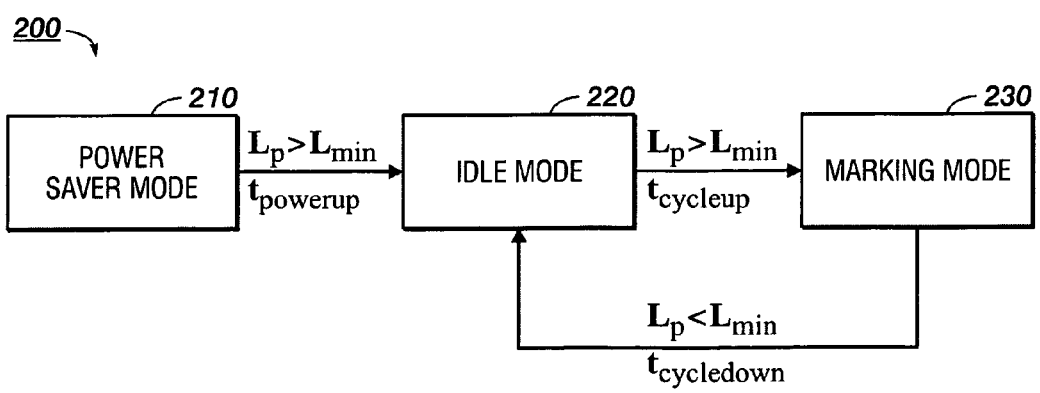
FIG. 2 illustrates a more detailed diagram of another embodiment.

FIG. 2 illustrates an exemplary state diagram 200 for the IOT 120 in accordance with another embodiment. It should be readily apparent to those of ordinary skill in the art that the state diagram 200 depicted in FIG. 2 represents a generalized illustration and that other states may be added or existing states may be removed or modified.

As shown in FIG. 2, the IOT 120 may initially be in a power saver mode 210. As discussed previously, the power saver mode characterized a state where minimal power is supplied to the IOT 120. The IOT 120 may transition to the idle mode 220 when the length of the output queue is greater than the predetermine queue length, where $\Delta_t$ being equal to time to powerup, i.e., $t_{powerup}$. The IOT 120 may transition from the idle mode 220 to marking mode 230 when the length of the output queue is greater than the predetermine queue length, where $\Delta_t$ being equal to time to cycleup from idle to marking mode, i.e., $t_{cycleup}$. The IOT 120 may transition from the marking mode 230 to the idle mode 220 when the length of the output queue is less than the predetermine queue length, where $\Delta_t$ being equal to time to cycledown from marking to idle mode, i.e., $t_{cycledown}$.

Figure 3:
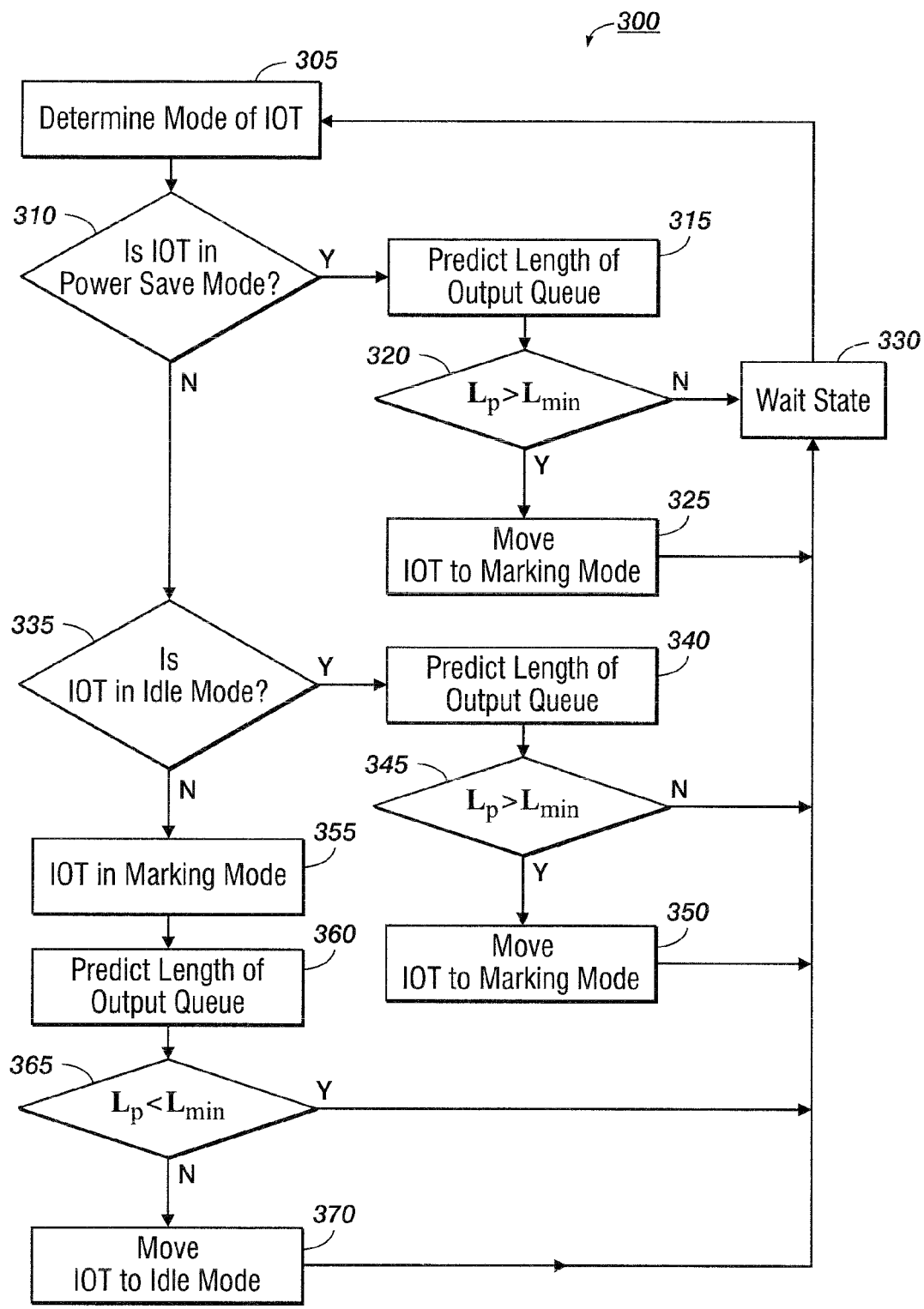
FIG. 3 illustrates an exemplary flow diagram for the queue monitoring module in accordance with yet another embodiment.

FIG. 3 illustrates an exemplary flow diagram 300 for the operation of the queue-monitoring module 150 (shown in FIG. 1) in accordance with yet another embodiment of the invention. It should be readily apparent to those of ordinary skill in the art that the flow diagram 300 represents a generalized illustration and that other steps may be added or existing steps may be removed or modified.

Referring to FIG. 3A, the queue-monitoring module 150 may be configured to determine the mode of the IOT 120, in step 305. In some embodiments, the queue-monitoring module 150 may be configured to check a status buffer for the current state information for the IOT. In other embodiments, the IOT may respond to a query for the current state information.

In step 310, the queue-monitoring module 150 may be configured to determine whether the IOT 120 is in the power saver mode. If the IOT 120 is in the power saver mode, the queue-monitoring module 150 may be configured to determine the predicted length of the output queue 140 using Equation 1 with $\Delta_t$ being equal to time to powerup from idle mode to marking mode, i.e., $t_{powerup}$, in step 315.

In step 320, the queue-monitoring module 150 may be configured to compare $L_p$ with $L_{min}$. If the $L_p$ is greater than $L_{min}$, the queue-monitoring module 150 may signal the IOT 120 to move from the power saver mode to the marking mode, in step 325. Subsequently, in step 330, the queue-monitoring module 150 may be configured to enter a wait state for the length of time to update, i.e., $t_{update}$, and then return to the processing of step 305. Otherwise, if $L_p$ is less than $L_{min}$, the queue-monitoring module 150 proceeds to the processing of step 330.

Returning to step 310, if the queue-monitoring module 150 determines that the IOT 120 is not in the power saver mode, the queue-monitoring module 150 determines whether the IOT 120 is in the idle mode, in step 335. If the IOT 120 is in the idle mode, the queue-monitoring module 150 determines $L_p$ using equation 1 where $\Delta_t$ being equal to the time to cycle up from idle mode to marking mode, i.e., $t_{cyclecup}$, in step 340.

In step 345, the queue-monitoring module 150 may be configured to compare $L_p$ with $L_{min}$. If the $L_p$ is greater than $L_{min}$, the queue-monitoring module 150 may signal the IOT 120 to move from the idle mode to the marking mode, in step 350. Subsequently, queue-monitoring module 150 may proceed to the processing associated with step 330. Otherwise, if $L_p$ is less than $L_{min}$, the queue-monitoring module 150 proceeds to the processing associated with step 330.

Returning to step 335, if the IOT 120 is not in the idle mode, the IOT 120 must be in the marking mode, in step 355 (shown in FIG. 3). The queue-monitoring module 150 determines $L_p$ using equation 1 where $\Delta_t$ being equal to the time to cycle down from marking mode to idle mode, i.e., $t_{cyclecdown}$, in step 360.

In step 365, the queue-monitoring module 150 may be configured to compare $L_p$ with $L_{min}$. If the $L_p$ is less than $L_{min}$, the queue-monitoring module 150 may signal the IOT 120 to move from the marking mode to the idle mode, in step 370. Subsequently, queue-monitoring module 150 may proceed to the processing associated with step 330 (shown in FIG. 3A). Otherwise, if $L_p$ is greater than $L_{min}$, the queue-monitoring module 150 proceeds to the processing associated with step 330 (shown in FIG. 3A).

Figure 4:
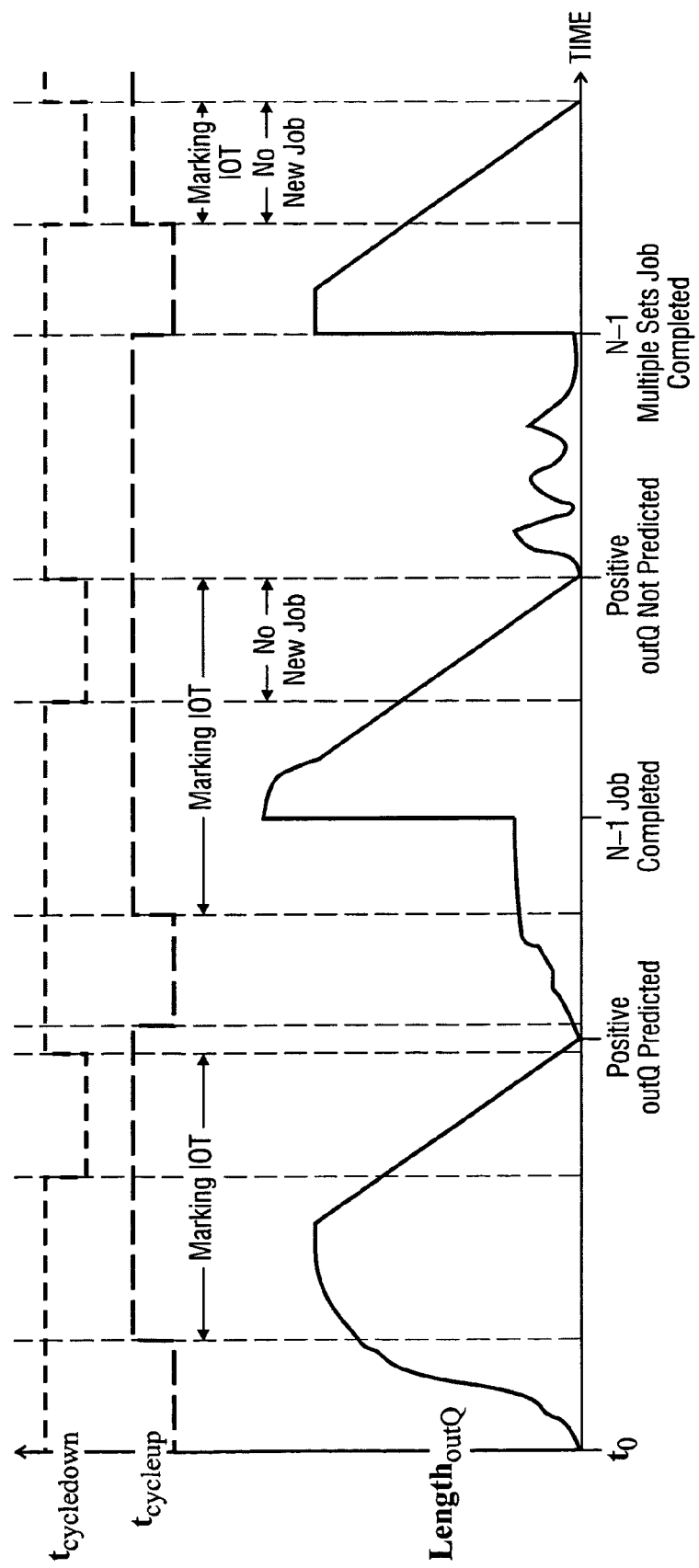
FIG. 4 illustrates a graph illustrating IOT control with adaptive cycling.

FIG. 4 illustrates a graph illustrating IOT control with adaptive cycling. The IOT is shown cycling up early based on the predicted queue length, avoiding skipped pitches, and completing the job runs as quickly as possible.

Figure 5:
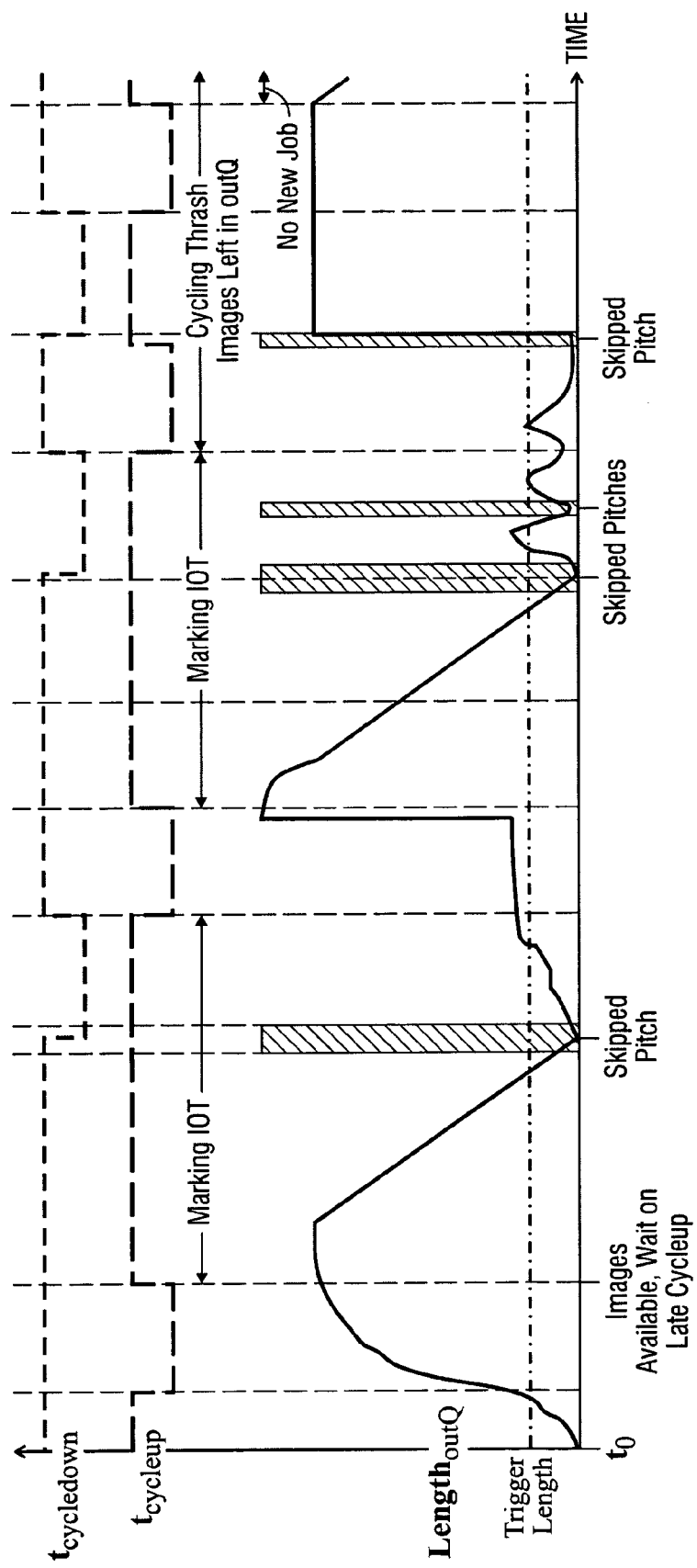
FIG. 5 illustrates a graph illustrating IOT control with a fixed length output queue trigger.

FIG. 5 illustrates a graph illustrating IOT control with a fixed length output queue trigger. The same job input scheme as above is shown when a fixed threshold is employed. The IOT takes longer to cycle-up, suffers a number of skipped pitches, and is caught cycling up and down in-efficiently.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated, or simultaneously. Those skilled in the art will recognize that these and other variations are possible within the spirit and scope as defined in the following claims and their equivalents.

What is claimed is:

1. A method of dynamically monitoring a complexity of a print job stream for printing at an image output terminal by a digital front end of a printing system, the method comprising:
    determining, at the digital front end of the printing system, an operational mode of the image output terminal, wherein the operational mode includes a power save mode, an idle mode and a marking mode;
    determining a predicted queue length of a queue for the image output terminal;
    comparing the predicted queue length with a predetermined queue length necessary to keep the image output terminal operational;
    changing the operational mode of the image output terminal, if the operational mode is the power save mode or the idle mode, to the marking mode based on the predicted queue length being greater than the predetermined queue length; and
    selecting the idle mode in response to the predicted queue length being less than the predetermined queue length.

2. The method according to claim 1, further comprising:
    determining the predicted length of the queue based on at least the present time and a time to power up for the image output terminal.

3. The method according to claim 1, further comprising:
    determining the predicted length of the queue based on at least the present time and a time to cycle up for the image output terminal.

4. The method according to claim 1, further comprising:
    changing the marking mode to the idle mode based on the predicted queue length being less than the predetermined queue length.

5. A system for monitoring, the system comprising:
    a digital front end;
    an image output terminal configured to be interfaced with the digital front end, wherein the digital front end further comprises:
        an output queue configured to queue print jobs to the image output terminal; and
        a queue monitoring module configured to monitor the output queue and interfaced with the image output terminal, wherein the queue monitoring module is configured to determine an operational mode of the image output terminal, wherein the operational mode includes a power save mode, an idle mode and a marking mode, determine a predicted queue length of the output queue, compare the predicted queue length with a predetermined queue length necessary to keep the device operational, change the operational mode of the image output terminal, if the operational mode is the power save mode or the idle mode to the marking mode based on predicted queue length being greater than the predetermined queue length and select the idle mode in response to the predicted queue length being less than the predetermined queue length.

6. The system according to claim 5, wherein the operational mode is the power saver mode and the queue monitoring module is further configured to determine the predicted length of the queue based on at least the present time and a time to power up for the image output terminal.

7. The system according to claim 5, wherein the operational mode is the idle mode and the queue monitoring module is further configured to determine the predicted length of the queue based on at least the present time and the time to cycle up for the image output terminal.

8. The system according to claim 5, wherein the operational mode is the marking mode and the queue monitoring module is further configured to determine the predicted length of the queue based on at least the present time and the time to cycle down for the image output terminal.

9. The system according to claim 8, wherein the queue monitoring module is configured to move the image output terminal from the marking mode to the idle mode in response to the predicted length being less than the predetermined queue length.

10. A non-transitory computer readable storage medium on which is embedded one or more computer programs, said one or more computer programs implementing a method of monitoring a print job stream, said one or more computer programs comprising a set of instructions for:

determining an operational mode of an image output terminal, wherein the operational mode includes a power save mode, an idle mode and a marking mode;

determining a predicted queue length of a queue for the image output terminal;

comparing the predicted queue length with a predetermined queue length necessary to keep the image output terminal operational;

changing the operational mode of the image output terminal, if the operational mode is the power save mode or the idle mode, to the marking mode based on predicted queue length being greater than the predetermined queue length; and selecting the idle mode in response to the predicted queue length being less than the predetermined queue length.

11. The non-transitory computer readable storage medium according to claim 10, wherein the operational mode is the power saver mode and the set of instructions further comprises determining the predicted length of the queue based on at least the present time and a time to power up for the image output terminal.

12. The non-transitory computer readable storage medium according to claim 10, wherein the operational mode is the idle mode and the set of instructions further comprises determining the predicted length of the queue based on at least the present time and a time to cycle up for the image output terminal.

13. The non-transitory computer readable storage medium according to claim 10, wherein the operational mode is the marking mode and the set of instructions further comprises changing the marking mode to a idle mode based on the predicted queue length being less than the predetermined queue length.

* * * * *